(12) United States Patent
Wu et al.

(10) Patent No.: US 10,364,903 B2
(45) Date of Patent: *Jul. 30, 2019

(54) MULTIFUNCTIONAL SOFTENING VALVE AND WATER PROCESSING APPARATUS THEREOF

(71) Applicant: WENZHOU RUNXIN MANUFACTURING MACHINE CO., LTD., Zhejiang (CN)

(72) Inventors: Xiao-Rong Wu, Zhejiang (CN); Hai-Lin Yuan, Zhejiang (CN)

(73) Assignee: WENZHOU RUNXIN MANUFACTURING MACHINE CO., LTD., Wenzhou, Zhejiang (CN)

(*) Notice: Subject to any disclaimer, the term of this patent is extended or adjusted under 35 U.S.C. 154(b) by 262 days.

This patent is subject to a terminal disclaimer.

(21) Appl. No.: 15/112,948

(22) PCT Filed: Jan. 20, 2015

(86) PCT No.: PCT/CN2015/071055
§ 371 (c)(1),
(2) Date: Jul. 20, 2016

(87) PCT Pub. No.: WO2015/106722
PCT Pub. Date: Jul. 23, 2015

(65) Prior Publication Data
US 2016/0341323 A1    Nov. 24, 2016

(30) Foreign Application Priority Data
Jan. 20, 2014 (CN) .......................... 2014 1 0025506

(51) Int. Cl.
*C02F 1/42* (2006.01)
*F16K 11/074* (2006.01)
(Continued)

(52) U.S. Cl.
CPC .......... *F16K 11/0743* (2013.01); *B01D 35/04* (2013.01); *B01J 49/85* (2017.01);
(Continued)

(58) Field of Classification Search
CPC ...... F16K 11/074; F16K 11/0743; C02F 1/42; C02F 2201/005; C02F 2303/16;
(Continued)

(56) References Cited

U.S. PATENT DOCUMENTS

| 3,701,360 A | 10/1972 | Morrison | |
| 2007/0074772 A1* | 4/2007 | Yang | F16K 11/0743 137/625.46 |
| 2015/0211645 A1* | 7/2015 | Hu | F16K 11/074 137/625.67 |

FOREIGN PATENT DOCUMENTS

| CN | 2503061 Y | 7/2002 |
| CN | 2719820 Y | 8/2005 |

(Continued)

*Primary Examiner* — Matthew O Savage
(74) *Attorney, Agent, or Firm* — Muncy, Geissler, Olds & Lowe, P.C.

(57) ABSTRACT

A multifunctional softening valve and a water processing apparatus thereof. The multifunctional softening valve comprises a valve body, an ejector, a movable valve plate, a fixed valve plate, and a saline water control valve. The valve body is provided with a water inlet, a water outlet, a water drainage port, and a salt absorbing branch runner. The valve body is provided with a through-hole in communication with a filter element upper portion, a filter element lower portion and an ejector inlet. An ejector outlet is in communication with the filter element lower portion. The salt absorbing branch runner is provided with a saline water inlet. The saline water inlet is provided with a saline water control valve. The fixed valve plate is provided with a plurality of through-holes, and the through-holes are distributed according to a distribution mode of equally dividing the cross (Continued)

section of the fixed valve plate into six parts, and the movable valve plate is fitted to the fixed valve plate. In the present application, by means of the distribution of equally dividing the plane softening valve into six parts, water processing functions are implemented.

6 Claims, 17 Drawing Sheets

(51) Int. Cl.
    *B01J 49/85*     (2017.01)
    *B01D 35/04*     (2006.01)
    *C02F 1/00*     (2006.01)
    *C02F 5/00*     (2006.01)

(52) U.S. Cl.
    CPC ................ *C02F 1/003* (2013.01); *C02F 1/42* (2013.01); *C02F 5/00* (2013.01); *C02F 2001/425* (2013.01); *C02F 2201/005* (2013.01); *C02F 2303/16* (2013.01)

(58) Field of Classification Search
    CPC ...... C02F 1/003; C02F 2001/425; C02F 5/00; B01J 49/85; B01D 35/04
    See application file for complete search history.

(56) References Cited

FOREIGN PATENT DOCUMENTS

| | | |
|---|---|---|
| CN | 2725659 Y | 9/2005 |
| CN | 2931971 Y | 8/2007 |
| CN | 201305482 Y | 9/2009 |
| CN | 102635705 A | 8/2012 |
| CN | 102635706 A | 8/2012 |
| CN | 102635707 A | 8/2012 |
| CN | 102840362 A | 12/2012 |
| CN | 103994250 A | 8/2014 |

\* cited by examiner

MULTIFUNCTIONAL SOFTENING VALVE AND WATER PROCESSING APPARATUS THEREOF

FIELD OF THE INVENTION

This invention relates to the field of water treatment system, especially for the multi-functional softener valve of water treatment system and the water treatment device provided with this multi-functional softener valve.

DESCRIPTION OF THE RELATED ART

In daily life, water contains much inorganic salt, such as calcium salt, magnesium salt, etc. This inorganic salt is invisible at ambient temperature in water. Once it is heated and boiled, calcium salt and magnesium salt will be precipitated as carbonates, which form water scale inside of kettle. Some water with high content of $Ca^{2+}$ and $Mg^{2+}$ does not form water scale because $Ca^{2+}$ and $Mg^{2+}$ are existed as chlorate that is soluble. Therefore, there is no water scale formed when the water is heated.

Generally, use "water hardness" to stand for the content of $Ca^{2+}$ and $Mg^{2+}$ in water. One degree of hardness stands for containing 10 mg of CaO per liter of water. If the hardness is less than 8 degrees, it is called soft water; if the hardness is more than 17 degrees, it is called hard water; if it's between 8 to 17 degrees, it is called medium level hard water. Rainwater, snow water, river water and lake water are all soft water; spring water, deep well water and seawater are hard water. For industry, it adopts different standard: the water is called soft water that the hardness is less than 1 degree, between 1 to 10 degrees is called hard water, and more than 10 degrees of hardness is called high hardness water.

The hardness of water has very great influence on our daily life. For example, there is no lather when washing clothes with hard water; people may be not acclimatized to the different hardness of drinking water when traveling to or living in a strange place; the water scale inside will make the kettle be with bad thermal conductivity; there may be an explosion if there is water scale in industrial boilers. Therefore, the water for daily life or industry should be with appropriate hardness. It is easy to get cardiovascular and cerebrovascular disease if drink soft water (purified water) usually; it is prone to having kidney stones if drink hard water (mineral water) usually.

The water hardness mainly consists of $Ca^{2+}$ and $Mg^{2+}$. When the raw hard water flows through resin of exchanger, the $Ca^{2+}$ and $Mg^{2+}$ will be absorbed by resin, and desorbs $Na^+$. Thus the water flows out from exchanger is soft water that removes hardness ions. When the resin absorbed much more $Ca^{2+}$ or $Mg^{2-}$ to get the certain saturation, the hardness of the outlet water will be increased. At that time, the softener will start regeneration automatically for invalid resin according to the preset procedure. The invalid resin will be refreshed by the high concentration of sodium chloride solution (brine).

The raw water described in this article refers to untreated water. Broadly speaking, it is called raw water before flowing into this procedure. For example, it is called raw water which from the source to clarifier. Namely, raw water can be tap water, river water or groundwater, etc.

The chemical equation of convert hard water to soft water:

Removal of $Ca^{2+}$:

$CaCO_3 + 2Na^+ = Ca^{2+} + Na_2CO_3$ $Ca(HCO_3)_2 + 2Na^+ = Ca^{2+} + 2NaHCO_3$

Removal of $Mg^{2+}$:

$MgCO_3 + 2Na^+ = Mg^{2+} + Na_2CO_3$ $Mg(HCO_3)_2 + 2Na^+ = Mg^{2+} + 2NaHCO_3$

In existing industrial or residential fluid control (treatment) system, in particular the water treatment system, softener system controls the flow direction of fluid to achieve the purpose of treating the fluid. By using the valve core of multi-functional softener valve (also named softener valve, control valve, etc.) to control the water flow direction and the flow path, utilizing the arrangement and location setting of flow channel to switch the flow channel, it can achieve each function of softening, backwash, down-flow or up-flow regeneration, brine refill with raw water or soft water, fast rinse, etc.

The existing multi-functional softener valve adopts hermetic head faces construction. By rotating the flat valve, it can achieve five functions of softening, backwash, regeneration, brine refill and fast rinse when in use. Such as Chinese patent CN 2719820Y Multi-functional Flow Control Valve for Water Treatment Systems, CN 2725659Y Multi-port Filter Valve, CN 2931971Y Manual Multi-port Valve, CN 201305482Y Multi-functional Softener Valve, CN 102635705A Multi-functional Softener Valve, CN 102635706A Multi-functional Softener Valve with Soft Water Refill, CN 102635707A Multi-functional Softener Valve, CN102840362A Multi-functional Softener Valve. Above Patent documents describe the construction features of this kind of water treatment multi-functional softener valve; however, there still have shortages.

In practical use, in most cases, users often use softening, backwash and fast rinse these three common functions. In the status of down-flow or up-flow regeneration, brine refill with raw water or soft water, the flow rate is smaller than above described status of softening, backwash and fast rinse. In order to prevent the water channeling in valve body during rotation of valve core, the hermetic head faces multi-port valve adopts dividing the flat valve into equal parts. It adopts the aliquot way as above described eight equal parts, even nine equal parts in the patent literature, such as CN 102635705A Multi-functional Softener Valve, CN 102635706A Multi-Functional Softener Valve with Soft Water Refill, CN 102635707A Multi-functional Softener Valve, CN102840362A Multi-functional Softener Valve. However, the increased number of aliquots on flat valve makes the flow path become narrower in valve body, which affects the flow rate. Besides, although regeneration and refilling the brine tank only require a small flow, these two stations also occupy the same areas of a given aliquot, which leads to decreasing the water flow of treatment valve.

To do this, there is a suggestion that increasing the inlet water flow, such as CN102840362A described that adopting a through-hole connecting to inlet, which occupies three eighths area of fixed valve. Although it may help to increase the flow rate of inlet water, the actual effect is not improved because there is no improvement for enlarging through-hole of fixed valve that connected to outlet. Therefore, the outlet water flow is still small. Because of the limitation of areas of flat valve, it is not advisable that only increasing the inlet water flow or increasing the outlet water flow. Only by increasing both of inlet and outlet water flow at the same time, can the technical problem be solved effectively that the water flow rate in water treatment is not big enough.

In addition, to different users' needs, some customers want to keep the function of the raw water flows out from outlet in regeneration process to solve the issue that no water for use during regeneration. The solution of using existing technology is that users can use raw water or soft water when softener valve refills the brine tank. However, the valve structure of softener valve has more aliquots that using soft water to solve this problem, and it is designed more complex. As above described, it needs to design more through-holes of fixed disk, which leads to decreasing the water flow of valve body. While, in some northern areas, due to the decline of the underground water table and the increase of raw water hardness, the existing fixed bed with down-flow or up-flow regeneration is difficult to remove the high hardness of water.

Floating bed softened water treatment is a form of the fixed bed for water treatment device. Its operation and regeneration are in opposite direction to up-flow regeneration fixed bed, which belongs to an up-flow regeneration bed. However, the water treatment valve for existing floating bed is with big bulk but small flow rate.

For the current water treatment devices, such as residential softeners, in order to be beautiful, generally are installed integrally that the resin tank is placed in a blow moulding cabinet, and then install the multi-functional softener valve. Generally, the sequence processes of multi-functional softener valve are softening, backwash, regeneration, brine refill, fast rinse or softening, backwash, regeneration, fast rinse, brine refill. That is to say, generally refill the brine tank before softening water, and there is water in the cabinet of residential softener which forms higher concentration of sodium chloride solution (brine). Thus, the resin tank of residential softener is soaked in brine all the time when the softener valve is in softening status that is the most commonly used and the longest running of the water treatment device, which will affect the using life of resin tank. In addition, it is easy to pollute the water.

SUMMARY OF THE INVENTION

Technical problem to be solved by present invention is to provide a softener valve to overcome the deficiency of the small flow caused by excessive number of aliquots of plat valve.

Another object of present invention is that this softener valve can refill the brine tank with soft water when in brine refill status.

A further object of present invention is let the users can use the raw water when the softener valve is in regeneration.

To achieve the above objects, the present invention provides a multi-functional softener valve that adopts hermetic head faces multi-port valve construction, which includes valve body, injector, moving disk, fixed disk and brine control valve. The described valve body is provided with inlet, outlet, drain and brine absorption branch of flow channel. Also it is provided with through-holes connected to the upper filter, lower filter, and injector inlet, injector outlet connected to the lower filter, brine inlet set on brine absorption branch of flow channel, brine control valve set on brine inlet. There are many through-holes in described fixed disk, and the through-holes are distributed in six equal parts of cross section of fixed disk. On the cross section of the fixed disk, in counterclockwise direction, there are many through-holes. Among them, the first through-hole and second through-hole are connected to upper filter that can be set separately or connectedly in accordance with needs. The third through-hole is connected to lower filter, the fourth through-hole is connected to outlet, and the fifth through-hole is connected to injector inlet. There is the sixth through-hole in the center of cross section of the described fixed disk that is connected to drain of valve body. The described fixed disk matches moving disk. On the cross section of moving disk, there is an inlet through-hole connected to inlet of valve body, a radial blind hole from center to circumferential direction, and an arc-shaped blind hole.

Further, the described injector inlet and injector outlet are set on the brine absorption branch of flow channel.

Further, the matching relationship of described moving disk, fixed disk and brine control valve includes: when the described inlet through-hole is connected to the second through-hole, the arc-shaped blind hole is connected to the third through-hole and the fourth through-hole, the radial blind hole is only connected to the sixth through-hole, and the brine control valve can be opened or closed; when the described inlet through-hole is connected to the third through-hole, the arc-shaped blind hole is only connected to the fourth through-hole, the radial through-hole is connected to the first through-hole and the sixth through-hole, and the brine control valve is closed; when the described inlet through-hole is connected to the fifth through-hole, the arc-shaped blind hole is only connected to the first through-hole, the radial through-hole is connected to the second through-hole and the sixth through-hole, and the brine control valve is opened; when the described inlet through-hole is connected to the first through-hole, the arc-shaped blind hole is only connected to the second through-hole, the radial blind hole is connected to the third through-hole and the sixth through-hole, and the brine control valve is closed.

The present invention also provides a multi-functional softener valve, which adopts hermetic head faces construction and includes valve body, injector, moving disk, fixed disk and brine control valve. The described valve body is provided with inlet, outlet, drain and brine absorption branch of flow channel. Also it is provided with through-holes connected to the upper filter, lower filter, and injector inlet, injector outlet connected to the upper filter, brine inlet set on brine absorption branch of flow channel, brine control valve set on brine inlet. There are many through-holes in described fixed disk, and the through-holes are distributed in six equal parts of cross section of fixed disk. On the cross section of the fixed disk, in circumferential direction, there are many through-holes. Among them, the first through-hole is connected to upper filter connector, and the second through-hole and the fifth through-hole are connected to lower filter, which can be set separately or connectedly in accordance with needs. The third through-hole is connected to outlet, and the fourth through-hole is connected to injector inlet. There is the sixth through-hole in the center of cross section of fixed disk that is connected to drain of valve body. The described fixed disk matches moving disk. On the cross section of moving disk, there is an inlet through-hole connected to inlet of valve body, a radial blind hole that is from center to circumferential direction, and an arc-shaped blind hole.

Further, the described injector inlet and injector outlet are set on the brine absorption branch of flow channel.

Further, the matching relationship of described moving disk, fixed disk and brine control valve includes: when the described inlet through-hole is connected to the first through-hole, the arc-shaped blind hole is connected to the second through-hole and the third through-hole, the radial blind hole is only connected to the sixth through-hole, and the brine control valve can be opened or closed; when the described inlet through-hole is connected to the second through-hole, the arc-shaped blind hole is only connected to the fifth through-hole, the radial through-hole is connected to the first through-hole and the sixth through-hole, and the brine control valve is closed; when the described inlet through-hole is connected to the fourth through-hole, the arc-shaped blind hole is only connected to the first through-hole, the radial through-hole is connected to the second through-hole and the sixth through-hole, and the brine control valve is opened; when the described inlet through-hole is connected to the first through-hole, the arc-shaped blind hole is only connected to the third through-hole, the radial blind hole is connected to the fifth through-hole and the sixth through-hole, and the brine control valve is closed.

The present invention also provides a multi-functional softener valve, which adopts hermetic head faces construction and includes valve body, injector, moving disk, fixed disk and brine control valve. The described valve body is provided with inlet, outlet, drain and brine absorption branch of flow channel. Also it is provided with through-holes connected to the upper filter, lower filter, and injector inlet, injector outlet connected to the lower filter, brine inlet set on brine absorption branch of flow channel, brine control valve set on brine inlet. There are many through-holes in described fixed disk, and the through-holes are distributed in six equal parts of cross section of fixed disk. On the cross section of the fixed disk, in counterclockwise direction, there are many through-holes. Among them, the first through-hole and second through-hole are connected to upper filter connector that can be set separately or connectedly in accordance with needs. The third through-hole is connected to lower filter. The fourth through-hole is connected to outlet, and the outer diameter of the fourth through-hole is bigger than other through-holes, which forms an arc-shaped bulge that is from center to circumferential direction. The fifth through-hole is connected to injector inlet. There is the sixth through-hole in the center of cross section of fixed disk that is connected to drain of valve body. The described moving disk matches fixed disk. On the cross section of moving disk, there is an inlet through-hole connected to inlet of valve body, a radial blind hole that is from center to circumferential direction, and an arc-shaped blind hole that has an arc-shaped bulge from center to circumferential direction, and the outer diameter of arc-shaped blind hole is bigger than inlet through-hole. The arc-shaped bulge of fixed disk matches the one of moving disk.

Further, the described injector inlet and injector outlet are set on the brine absorption branch of flow channel.

Further, the matching relationship of described moving disk, fixed disk and brine control valve includes: when the described inlet through-hole is connected to the second through-hole, the arc-shaped blind hole is connected to the third through-hole and the fourth through-hole, the radial blind hole is only connected to the sixth through-hole, and the brine control valve can be opened or closed; the outer diameter of the fourth through-hole of fixed disk is bigger than other through-holes on gyration radius; the part of outer diameter of arc-shaped blind hole on the fixed disk is as big as outer diameter of the fourth through-hole. In this fitting state, the big outer diameter parts of the fourth through-hole and arc-shaped blind through-hole are overlapped; when the described inlet through-hole is connected to the third through-hole, the arc-shaped blind hole is only connected to the fourth through-hole, the radial through-hole is connected to the first through-hole and the sixth through-hole, the brine control valve is closed, and the fourth through-hole is not covered completely; when the described inlet through-hole is connected to the fifth through-hole, the arc-shaped blind hole is only connected to the first through-hole, the radial through-hole is connected to the second through-hole and the sixth through-hole, the brine control valve is opened, and the fourth through-hole is not covered completely; when the described inlet through-hole is connected to the first through-hole, the arc-shaped blind hole is only connected to the second through-hole, the radial blind hole is connected to the third through-hole and the sixth through-hole, the brine control valve is closed, and the fourth through-hole is not covered completely.

The present invention further provides a multi-functional softener valve, which adopts hermetic head faces construction and includes valve body, injector, moving disk, fixed disk and brine control valve. The described valve body is provided with inlet, outlet, drain and brine absorption branch of flow channel. Also it is provided with through-holes connected to the upper filter, lower filter, and injector inlet, injector outlet connected to the lower filter, brine inlet set on brine absorption branch of flow channel, brine control valve set on brine inlet. There are many through-holes in described fixed disk, and the through-holes are distributed in six equal parts of cross section of fixed disk. On the cross section of the fixed disk, in counterclockwise direction, there are many through-holes. Among them, the first through-hole and second through-hole are connected to upper filter that can be set separately or connectedly in accordance with needs. The third through-hole is connected to lower filter. The fourth through-hole is connected to outlet. The fifth through-hole is connected to injector inlet. The described moving disk matches the fixed disk. On the cross section of moving disk, there is an inlet through-hole connected to inlet of valve body, a drain through-hole and an arc-shaped blind hole.

Further, the described injector inlet and injector outlet are set on the brine absorption branch of flow channel.

Further, the described drain through-hole is connected to the drain of valve body.

Further, the matching relationship of described moving disk, fixed disk and brine control valve includes: when the described inlet through-hole is connected to the second through-hole, the arc-shaped blind hole is connected to the third through-hole and the fourth through-hole, the drain through-hole does not pass, and the brine control valve can be opened or closed; when the described inlet through-hole is connected to the third through-hole, the arc-shaped blind hole is only connected to the fourth through-hole, the drain through-hole is connected to the first through-hole, and the brine control valve is closed; when the described inlet through-hole is connected to the fifth through-hole, the arc-shaped blind hole is only connected to the first through-hole, the drain through-hole is connected to the second through-hole, and the brine control valve is opened; when the described inlet through-hole is connected to the first through-hole, the arc-shaped blind hole is only connected to the second through-hole, the drain through-hole is connected to the third through-hole, and the brine control valve is closed.

The present invention further provides a multi-functional softener valve, which adopts hermetic head faces construction and includes valve body, injector, moving disk, fixed disk and brine control valve. The described valve body is provided with inlet, outlet, drain and brine absorption branch of flow channel. Also it is provided with through-holes connected to the upper filter, lower filter, and injector inlet, injector outlet connected to the upper filter, brine inlet set on brine absorption branch of flow channel, brine control valve set on brine inlet. There are many through-holes in described fixed disk, and the through-holes are distributed in six equal parts of cross section of fixed disk. On the cross section of the fixed disk, in counterclockwise direction, there are many through-holes. Among them, the first through-hole is connected to lower filter. The second through-hole is connected to drain through-hole. The third through-hole is connected to upper filter. The fourth through-hole is connected to outlet. The fifth through-hole is connected to injector inlet. The described moving disk matches the fixed disk. On the cross section of moving disk, there is an inlet through-hole connected to inlet of valve body and an arc-shaped blind hole.

Further, the described injector inlet and injector outlet are set on the brine absorption branch of flow channel.

Further, the matching relationship of described moving disk, fixed disk and brine control valve includes: when the described inlet through-hole is connected to the first through-hole, the arc-shaped blind hole is connected to the third through-hole and the fourth through-hole, and the brine control valve can be opened or closed; when the described inlet through-hole is connected to the fifth through-hole, the arc-shaped blind hole is connected to the first and the second through-hole, and the brine control valve is opened; when the described inlet through-hole is connected to the first through-hole, arc-shaped blind hole is connected to the second and the third through-hole, and the brine control valve is closed.

Further, the present invention provides at least one multi-functional softener valve as above described that connected to a tank with resin, which forms a water treatment device.

The Beneficial Effects of the Invention

1. The present invention separates two processes with small requirement of flow rate, brine draw for regeneration process and brine refill process, from the original softener valve processes, and sets a brine control valve on brine absorption branch of flow channel to control these two processes to instead of, which takes full advantage of the limited area of fixed disk of hermetic head faces multi-port valve. And it adopts the layout and structure of six equal parts for flat softener valve, which not only achieves the functions of softening water, backwash, up-flow regeneration with soft water refilling or down-flow regeneration with raw water refilling, fast rinse, but also has a bigger flow rate than flat softener valve that adopting eight equal parts or nine equal parts in the same area of disk. The present invention increases 30% of flow rate compared to the one adopting eight equal parts. Meanwhile, it achieves the function of refilling the soft water to the brine tank, which has a better effect of resin regeneration of water treatment device.

2. The present invention increases the outer diameter of the through-hole that connected to fixed disk and outlet, which achieves a function that the raw water flows out when the valve in regeneration process and is consistent with the functional requirements of users.

3. Because the rational layout of through-holes of fixed disk, this invention achieves a function of floating bed, namely the resin is in a floating status when it is in a process of softening water. Compared to the down-flow regeneration fixed bed, the floating bed that adopting the invented multi-functional softener valve can treat the higher hardness raw water.

DESCRIPTION OF THE PREFERRED EMBODIMENTS

Detailed Description of the Preferred Embodiment

In accordance with the attached figures and examples, the preferred embodiment of the invention will be further described. The following examples are only the illustration of this invention, but not using for limiting its range.

Figure 1:
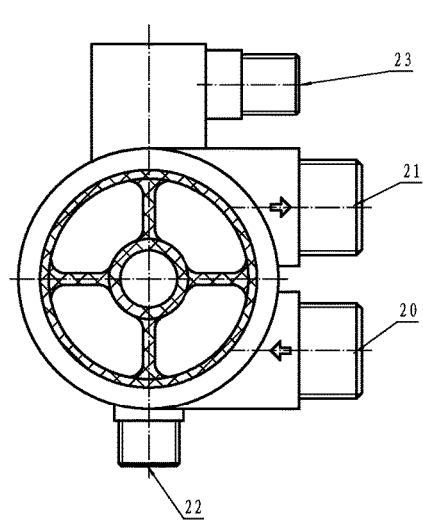
FIG. 1 is a top view of the invention (Outside view)
Figure 2:
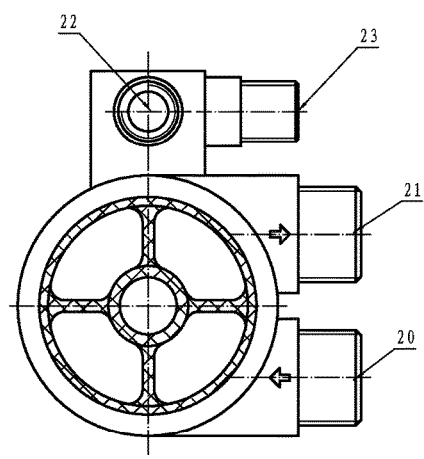
FIG. 2 is another top view of the invention (Outside view)
Figure 3:
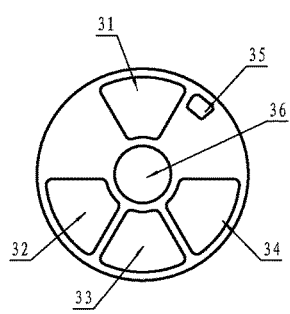
FIG. 3 is a structure schematic view of a fixed disk of Example 1 of the invention (Top view of the fixed disk)
Figure 4:
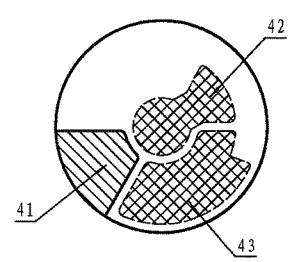
FIG. 4 is a top view of a moving disk of Example 1 of the invention (Top view of the moving disk)
Figure 5:
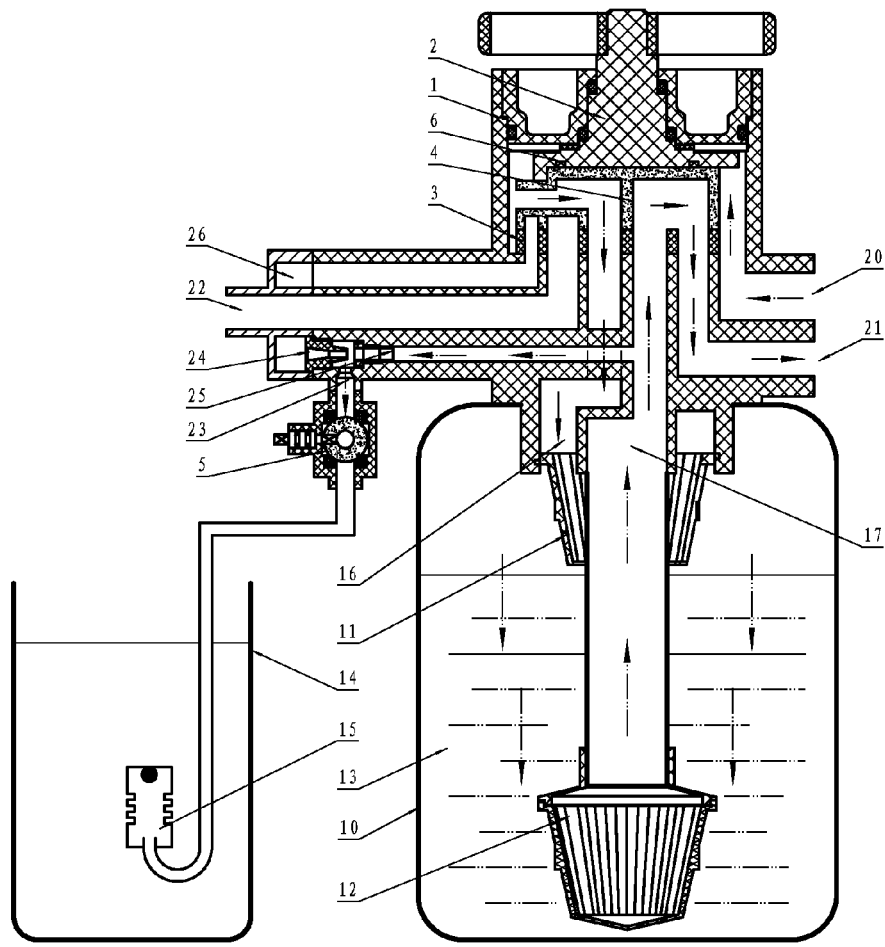
FIG. 5 is a structure schematic view of Example 1 of the invention that is in softening water status.

Referring to FIG. 5, when using this invention, install the softener valve on the water tank 10, filter 13 is set in the water tank 10, or filling in the water tank 10 with filter materials directly to form filter 13. The upper filter connector 16 of the valve body 1 is connected to filter element through the top strainer 11, and the lower filter connector 17 is connected to filter element through the bottom strainer. Inlet 20 is connected to the raw water, and drain 22 is connected to the drain. Brine inlet 23 is connected to brine tank 14 through brine control valve 5 and hose. The described brine control valve adopts existing techniques that can be the one of ball valve, solenoid valve, check valve, diaphragm valve or gate valve. Manual or automatic driving, rotate the shaft or the valve core of brine control valve as required.

When the filter element of this invention is made up of granular materials, it can be called upper filter and lower filter in textual description. When adopting the claviform or tubular filter element, it can be called outer filter and inner filter in textual description. The following illustration only depends on the filter element made up of granular materials.

Example 1: Project of Six Equal Parts Up-Flow Regeneration Softener Calve, which Refills with Soft Water As shown in FIG. 1 to FIG. 5, this example uses fixed disk and moving disk shown in FIG. 3 and FIG. 4. The valve body of the multi-functional softener valve in Example 1 is provided with inlet 20, outlet 21, drain 22, upper filter connector 16, lower filter connector 17 and branch of flow channel 26. On branch of flow channel, there is the injector inlet 24, injector outlet 25 that connected to the lower filter connector 17, brine inlet 23 and brine control valve 5 connected to brine inlet 23. In valve body 1, there is fixed disk 3, moving disk 4, seal ring 6 and the shaft 2 that can rotate the moving disk 4. There is the through-hole 36 and drain 22 that connected to valve body in the center of fixed disk 3. In the outer rotating radius, there are five through-holes. Among them, the first through-hole 31 and the second through-hole 32 are connected to upper filter connector 16, the third through-hole 33 is connected to the lower filter connector 17, the fourth through-hole 34 is connected to outlet 21, and the fifth through-hole 35 is connected to injector inlet 24 by branch of flow channel 26. There is a through-hole 41 connecting to inlet 20, a radial blind hole 42 that is from center to circumferential direction, and an arc-shaped blind hole 43 that round the central in moving disk 4. The through-holes of fixed disk 3 and moving disk 4 are matching in the same rotating radius. In production, fixed disk 3 and moving disk 4 adopt different materials as ceramic, plastic, metal, etc. The through-hole 31 and through-hole 32 of fixed disk can be connected to be one through-hole, but it is inconvenient to process.

Such designed softener valve has the following advantages: 1, Brine draw for regeneration and brine refill can be controlled by brine control valve 5 that only require a small flow, and the disk can be divided in six equal parts, which can increase the flow rate. 2, Brine refill can be controlled by procedure or brine control valve 5 manually when it needs. For the softener valve of residential softener, it can achieve brine refill after service, in service, or any other time when it needs, which has a wider range of applications. At the same time, it can save regeneration time. 3, Controlling by brine control valve 5, the brine tank can be refilled with soft water, which will enhance a better regeneration effect of resin. 4, This example adopts up-flow regeneration, which can enhance the regeneration effect of resin and save salt and water.

The following illustration is about the details of different functions of the fixed disk and moving disk in different matching status.

Figure 6:
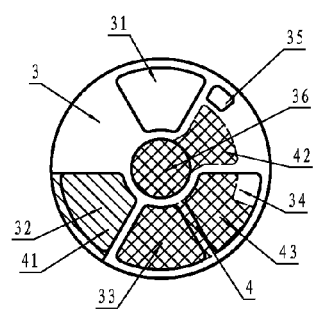
FIG. 6 is a matching schematic view of moving disk relative to fixed disk in FIG. 5 (Service)

Softening water status: Referring to FIG. 5 and FIG. 6, by rotating the shaft 2, the through-hole 41 of moving disk 4 and the second through-hole 32 of fixed disk 3 overlap, the blind hole 43 is connected to the third through-hole 33 and the fourth through-hole 34, the blind hole 42 is only connected to the sixth through-hole 36, and the brine control valve 5 is closed. At that time, water flows through the inlet 20 into the through-hole 41 and then flows into the second through-hole 32, through valve body 1 to the upper filter connector 16, through the top strainer 11 to tank 10, after treated by filter element 13, through bottom strainer 12 to lower filter connector 17, then flows through the third through-hole 33, through blind hole 43 to the fourth through-hole 34, and then flows out from outlet 21 as the fourth through-hole 34 connected to outlet 21. At that time, blind hole 42 is only connected to the sixth through-hole 36, and no water flows. Injector outlet 25 is often connected to lower filter connector 17, and the water flows through injector outlet 25, injector inlet 24, and branch of flow channel 26 to the fifth through-hole 35. Because the fifth through-hole does not pass and brine control valve 5 is closed, so no water flows.

Figure 7:
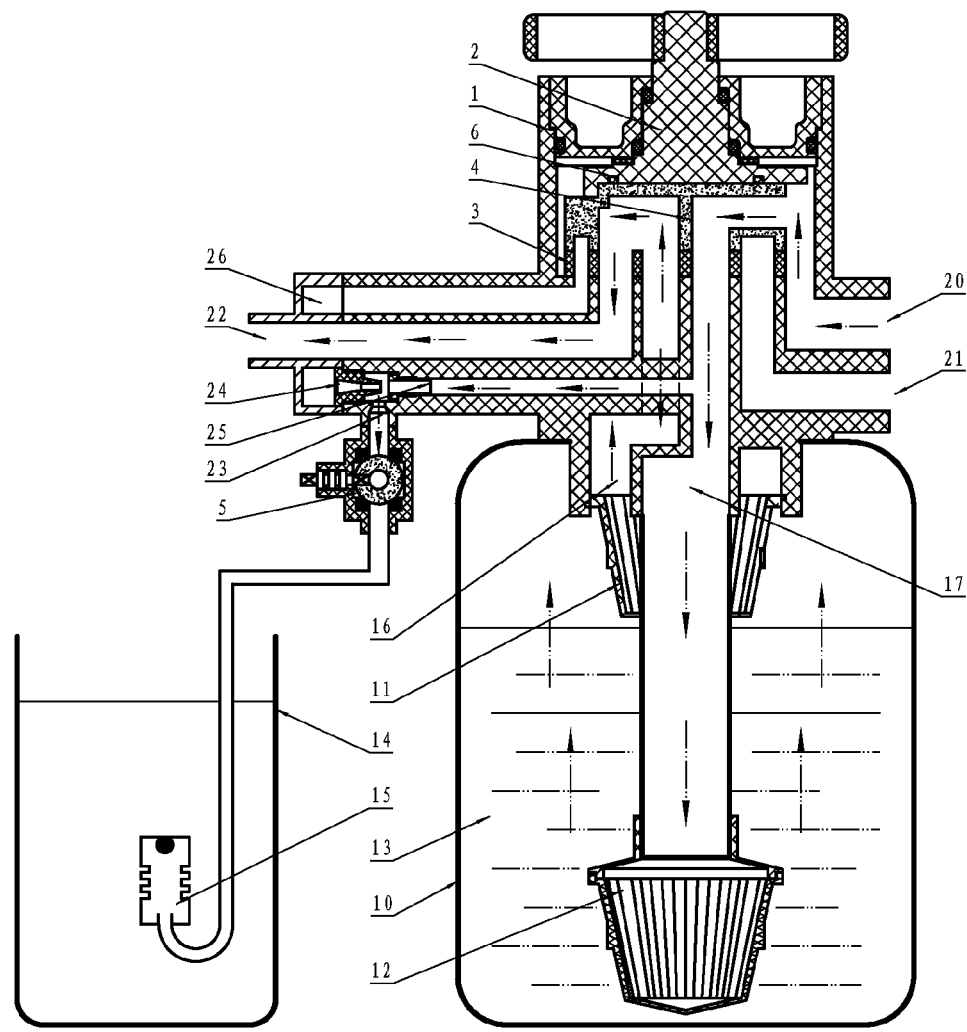
FIG. 7 is a structure schematic view of Example 1 of the invention that is in backwash status.
Figure 8:
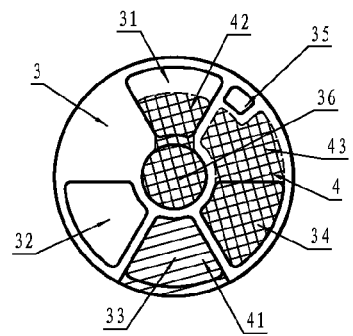
FIG. 8 is a matching schematic view of moving disk relative to fixed disk in FIG. 7 (Backwash)

Backwash status: Referring to FIG. 7 and FIG. 8, by rotating the shaft 2, the through-hole 41 of moving disk 4 and the third through-hole 33 of fixed disk 3 overlap, the blind hole 42 is connected to the first through-hole 31 and the sixth through-hole 36, the blind hole 43 is only connected to the fourth through-hole 34, and the brine control valve 5 is closed. At that time, water flows from the inlet 20 into the through-hole 41 and then flows into the third through-hole 33, through valve body 1 to the lower filter connector 17, through the bottom strainer 12 to tank 10, and flows up through and rinses filter element 13, and the dirt goes through top strainer 11 to the upper filter connector 16, then goes through the first through-hole 31 and blind hole 42 to the sixth through-hole 36. Because the connection of the sixth through-hole 36 and drain 22, the water flows from drain 22. At that time, the blind hole 43 is only connected to the fourth through-hole 34, and no water flows.

Figure 9:
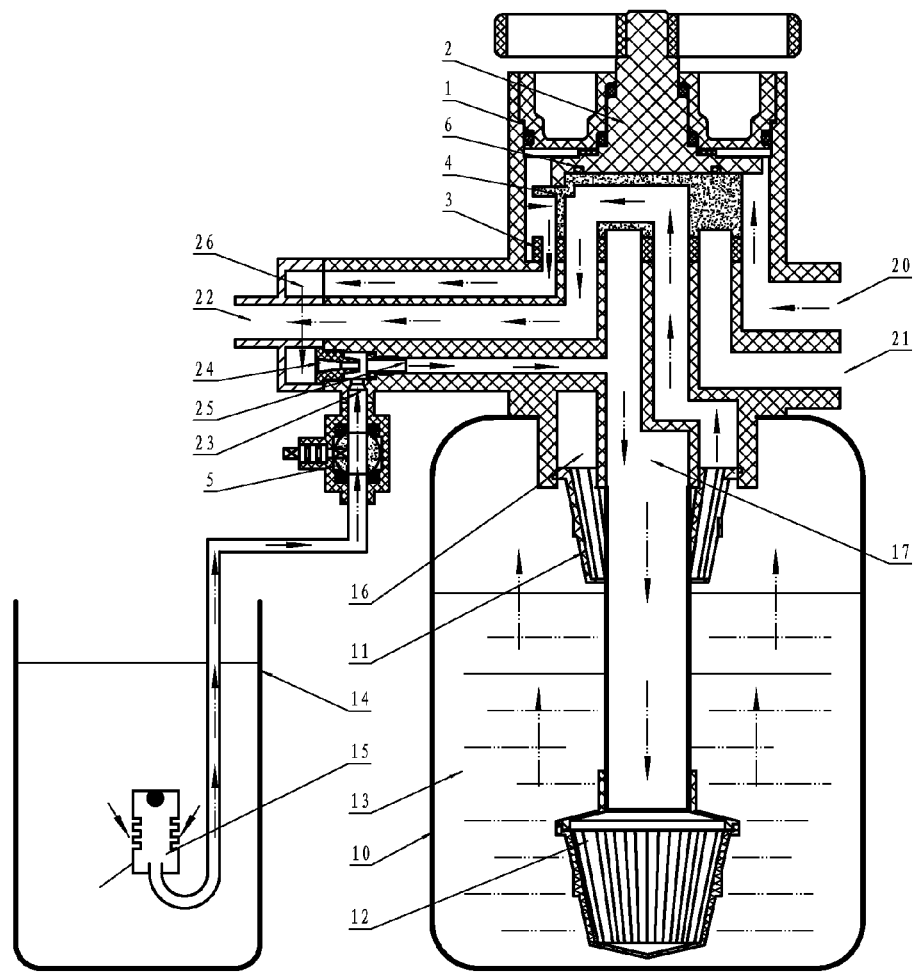
FIG. 9 is a structure schematic view of Example 1 of the invention that is in up-flow brine draw for regeneration status.
Figure 10:
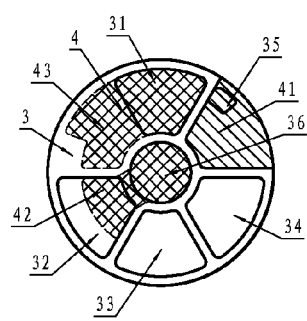
FIG. 10 is a matching schematic view of moving disk relative to fixed disk in FIG. 9 (Brine draw)

Up-flow regeneration status: Referring to FIG. 9 and FIG. 10, by rotating the shaft 2, the through-hole 41 of moving disk 4 and the fifth through-hole 35 of fixed disk 3 overlap, the blind hole 42 is connected to the second through-hole 32 and the sixth through-hole 36, and the blind hole 43 is only connected to the first through-hole 31. At that time, water flows through the inlet 20 into the through-hole 41 and then flows into the fifth through-hole 35, through branch of flow channel 26 into the injector inlet 24. After ejection, there is negative pressure in brine inlet 23, and opens the brine control valve 5. At that time, the regenerate in brine tank 14 goes to brine control valve 5 and brine inlet 23 through pipeline. It is mixed with the water flowing from injector inlet 24, and then goes to injector outlet 25. Because injector outlet 25 connected to lower filter connector 17, the mixed water flows through lower filter connector 17, bottom strainer 12 and then into the tank 10. It goes up through filter element 13 and regenerates the filter element 13, then through top strainer 11 to upper filter connector 16. Then water flows to the second through-hole 32, through blind hole 42 to the sixth through-hole 36. Finally, it flows from drain 22. At that time, blind hole 43 is only connected to the first through-hole 31, and no water flows.

Figure 11:
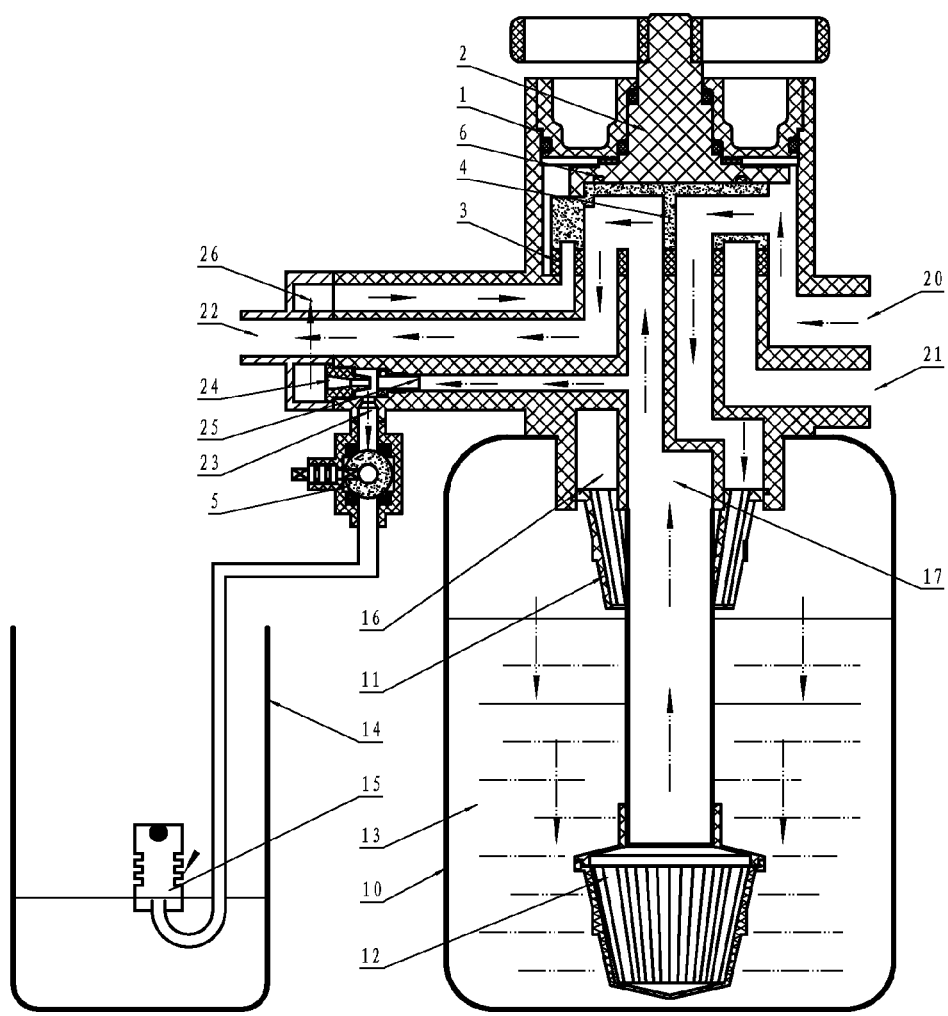
FIG. 11 is a structure schematic view of Example 1 of the invention that is in fast rinse status.
Figure 12:
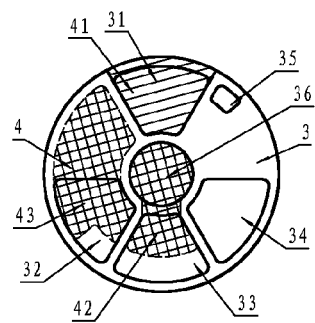
FIG. 12 is a matching schematic view of moving disk relative to fixed disk in FIG. 11 (Fast rinse)

Fast rinse status: Referring to FIG. 11 and FIG. 12, by rotating the shaft 2, the through-hole 41 of moving disk 4 and the first through-hole 31 of fixed disk 3 overlap, the blind hole 42 is connected to the third through-hole 33 and the sixth through-hole 36, the blind hole 43 is only connected to the second through-hole 32, and the brine control valve 5 is closed. At that time, water flows through the inlet 20 into the through-hole 41 and then flows into the first through-hole 31, through valve body 1 to the upper filter connector 16, through the top strainer 11 to tank 10, goes down through filter element 13 and rinses the residual regenerate, and the residue goes through bottom strainer 12 to the lower filter connector 17, then goes through the third through-hole 33 and blind hole 42 to the sixth through-hole 36. Finally, flows out from drain 22. At that time, the blind hole 43 is only connected to the second through-hole 32, and no water flows.

Figure 13:
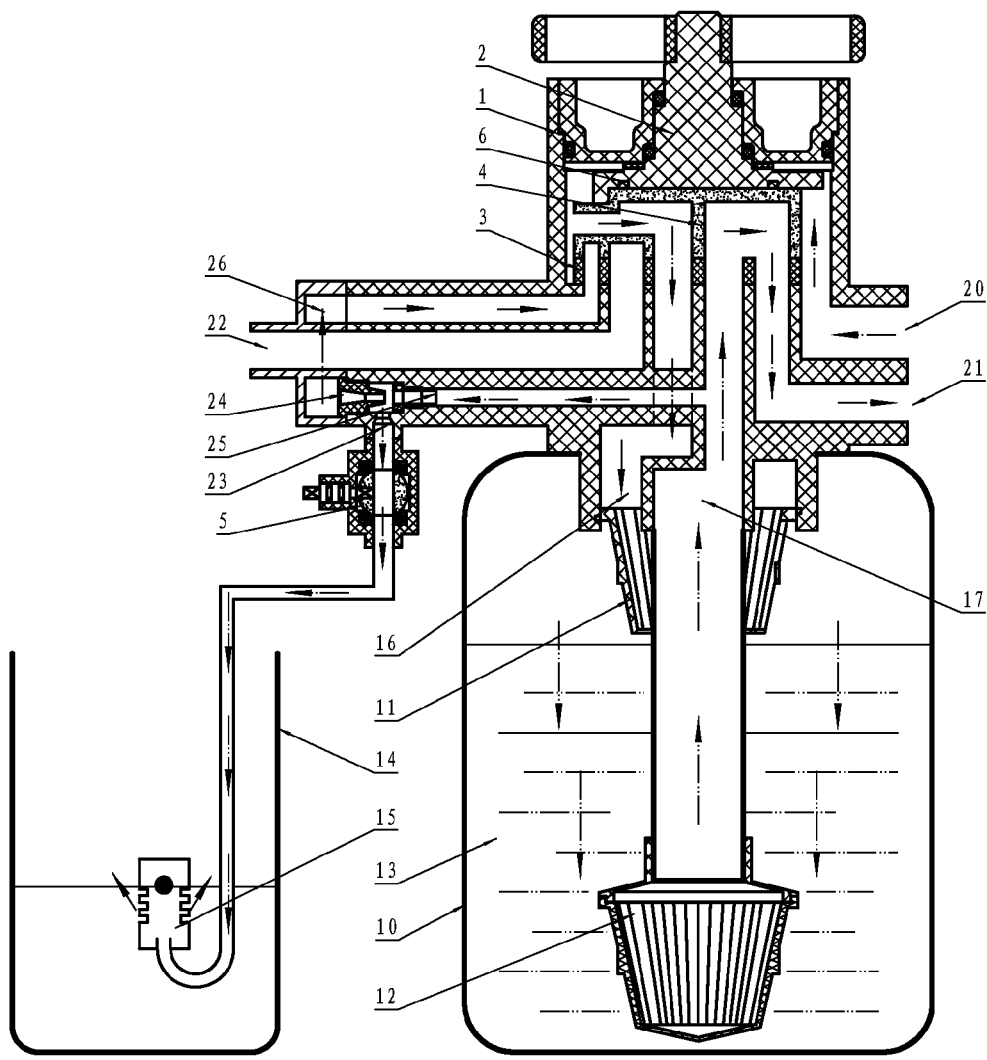
FIG. 13 is a structure schematic view of Example 1 of the invention that is in softening water and brine refill status.
Figure 14:
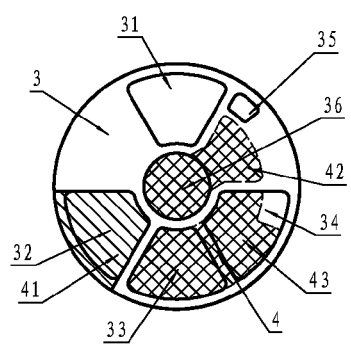
FIG. 14 is a matching schematic view of moving disk relative to fixed disk in FIG. 13, same as FIG. 6 (Brine refill)
Figure 15:
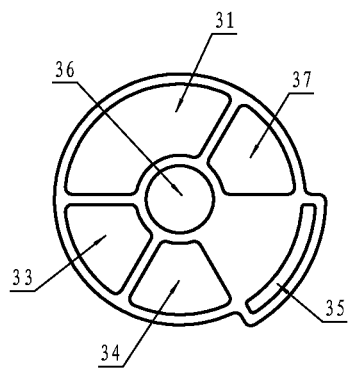
FIG. 15 is a structure schematic view of a fixed disk of Example 2 of the invention (Top view of the fixed disk)
Figure 16:
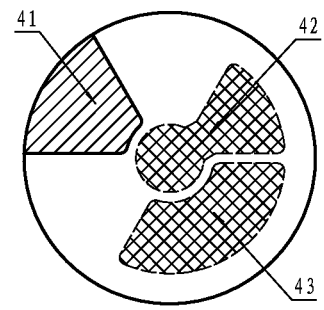
FIG. 16 is a top view of a moving disk of Example 2 of the invention (Top view of the moving disk)

Brine refill status: When brine refill, it only needs to open brine control valve 5, because brine control valve 5 is connected to brine tank 14, and brine control valve 5 is connected to lower filter connector 17 through brine inlet 23 and injector outlet 25. Thus, in the status of softening, backwash and fast rinse, open the brine control valve 5 to refill the brine tank. The following illustration is about the brine refill when in softening status. Referring to FIG. 13 and FIG. 14, by rotating the shaft 2, the through-hole 41 of moving disk 4 and the second through-hole 32 of fixed disk 3 overlap, the blind hole 43 is connected to the third through-hole 33 and the fourth through-hole 34, the blind hole 42 is only connected to the sixth through-hole 36, and the brine control valve 5 is opened. At that time, water flows from the inlet 20 into the through-hole 41 and then flows into the second through-hole 32, through valve body 1 to the upper filter connector 16, through the top strainer 11 to tank 10, after treated by filter element 13, goes through bottom strainer 12 to the lower filter connector 17, then goes through the third through-hole 33 and blind hole 43 to the fourth through-hole 34. Because the fourth through-hole 34 is connected to outlet 21, water flows out from outlet 21. At that time, the blind hole 42 is only connected to the sixth through-hole 36, and no water flows. Because the lower filter connector 17 is connected to injector outlet 25, a part of water goes through lower filter connector 17 to injector outlet 25, through brine inlet 23 and brine control valve 5 to brine tank 14. The water flowing out from injector outlet 25 goes through injector inlet 24, branch of flow channel 26 to the fifth through-hole 35 of fixed disk 3, and the fifth through-hole 35 does not pass, so no water flows.

Example 2: Project of Six Equal Parts Down-Flow Regeneration Softener Valve, which Refills with Raw Water As shown in FIG. 15 to FIG. 21, this example uses fixed disk and moving disk shown in FIG. 15 and FIG. 16. The valve body of the multi-functional softener valve in example is provided with inlet 20, outlet 21, drain 22, upper filter connector 16, lower filter connector 17 and branch of flow channel 26. On branch of flow channel, there is injector inlet 24, injector outlet 25 that connected to the upper filter connector 16, brine inlet 23 and brine control valve 5 connected to brine inlet 23. In valve body 1, there is fixed disk 3, moving disk 4, seal ring 6 and the shaft 2 that can rotate the moving disk 4. There is the sixth through-hole 36 in the center of fixed disk 3 that connected to drain 22. In the outer rotating radius, there are five through-holes. Among them, the first through-hole 31 is connected to upper filter connector 16, the second through-hole 33 and the fifth through-hole 37 are connected to lower filter connector 17, the third through-hole 34 is connected to outlet 21, and the fourth through-hole 35 is connected to injector inlet 24 by branch of flow channel 26. There is a through-hole 41 connected to inlet 20, a radial blind hole 42 that is from center to circumferential direction, and an arc-shaped blind hole 43 that round the central in moving disk 4. The through-holes of fixed disk 3 and moving disk 4 are matching in the same rotating radius. In production, fixed disk 3 and moving disk 4 adopt different materials such as ceramic. The through-hole 33 and through-hole 37 of fixed disk can be connected to be one through-hole, but it is inconvenient to process.

Such designed softener valve has the following advantages: 1, Brine draw for regeneration and brine refill can be controlled by brine control valve 5 that only require a small flow, and the disk can be divided in six equal parts, which can increase the flow rate. 2, Brine refill can be controlled by procedure or brine control valve 5 manually when it needs. For the softener valve of residential softener, it can achieve brine refill after service, in service, or any other time when it needs, which has a wider range of applications. At the same time, you can save regeneration time. 3, This example adopts down-flow regeneration, which can make the resin regenerate without confusing the filtering layer.

Figure 17:
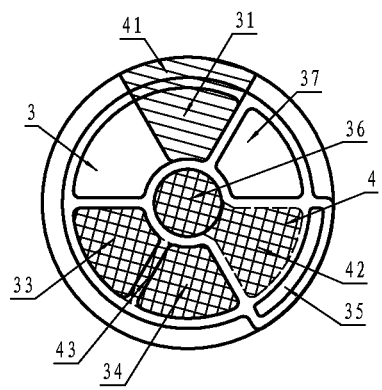
FIG. 17 is a matching schematic view of moving disk relative to fixed disk when Example 2 of the invention in softening water status (Service)
Figure 18:
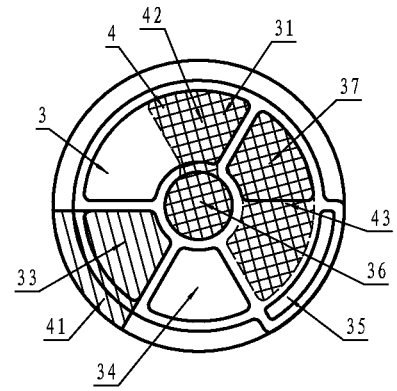
FIG. 18 is a matching schematic view of moving disk relative to fixed disk when Example 2 of the invention in backwash status (Backwash)
Figure 19:
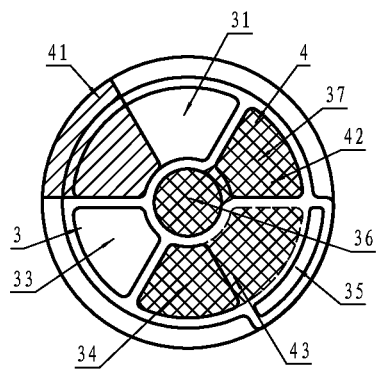
FIG. 19 is a matching schematic view of moving disk relative to fixed disk when Example 2 of the invention in fast rinse status (Fast rinse)

The differences between Example 2 and Example 1: In Example 2, there has one more hole connected to lower filter connector than Example 1, and has one less hole connected to upper filter connector than Example 1. The minimal inner diameter of the fourth through-hole of fixed disk is bigger than the outer diameter of other through-holes. Injector outlet 25 is connected to upper filter connector 16. But in Example 1, injector outlet 25 is connected to lower filter connector 17. FIG. 17, FIG. 18 and FIG. 19 are the matching schematic views of moving disk relative to fixed disk in service, backwash and fast rinse. The following illustration is only about the brine draw for regeneration status and the other four functions are no longer specified.

Figure 20:
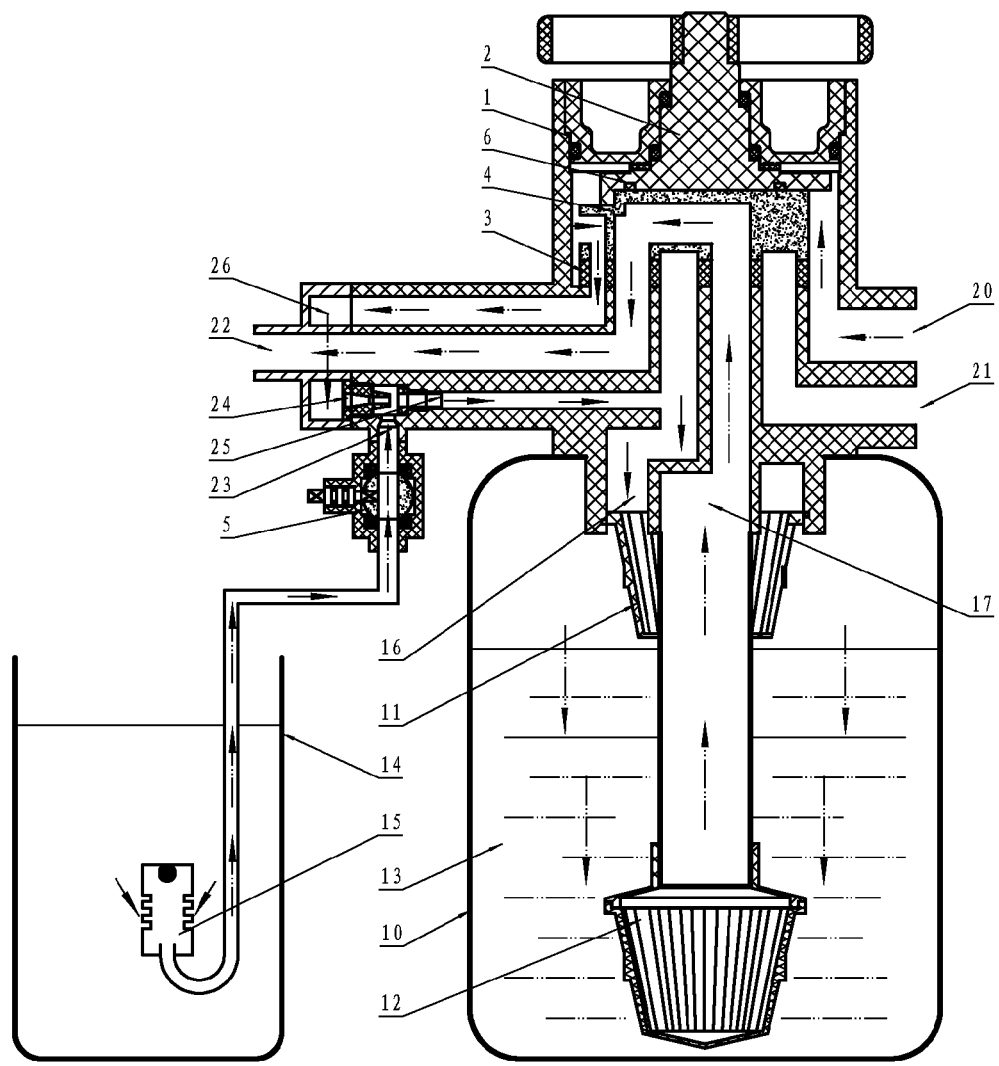
FIG. 20 is a structure schematic view of Example 2 of the invention that is in down-flow brine draw status.
Figure 21:
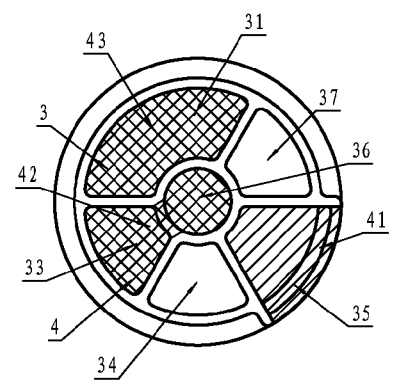
FIG. 21 is a matching schematic view of moving disk relative to fixed disk in FIG. 20 (Brine draw)

Down-flow regeneration status: Referring to FIG. 20 and FIG. 21, by rotating the shaft 2, the through-hole 41 of moving disk 4 and the fourth through-hole 35 of fixed disk 3 overlap, the blind hole 42 is connected to the second through-hole 33 and the sixth through-hole 36, and the blind hole 43 is only connected to the first through-hole 31. At that time, water flows from the inlet 20 into the through-hole 41 and then flows into the fourth through-hole 35, through branch of flow channel 26 into the injector inlet 24. After ejection, there is negative pressure in brine inlet 23, and opens the brine control valve 5. At that time, the regenerate in brine tank 14 goes to brine control valve 5 and brine inlet 23 through pipeline. It is mixed with the water flowing from injector inlet 24, and then goes to injector outlet 25. Because injector outlet 25 is connected to upper filter connector 16, the mixed water flows through upper filter connector 16, top strainer 11 and then into the tank 10. It goes down through filter element 13 and regenerates the filter element, then goes through bottom strainer 12 to lower filter connector 17. Then water flows to the second through-hole 33, through blind hole 42 to the sixth through-hole 36. Finally, it flows from drain 22 because the sixth through-hole is connected to drain 22. At that time, blind hole 43 is only connected to the first through-hole 31, and no water flows.

Figure 22:
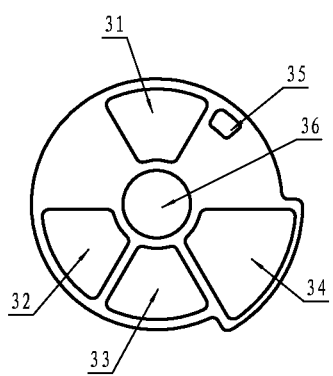
FIG. 22 is a structure schematic view of a fixed disk of Example 3 of the invention (Top view of the fixed disk)
Figure 23:
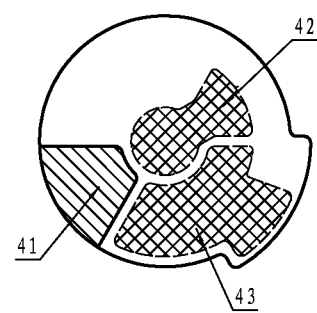
FIG. 23 is a top view of a moving disk of Example 3 of the invention (Top view of the moving disk)
Figure 24:
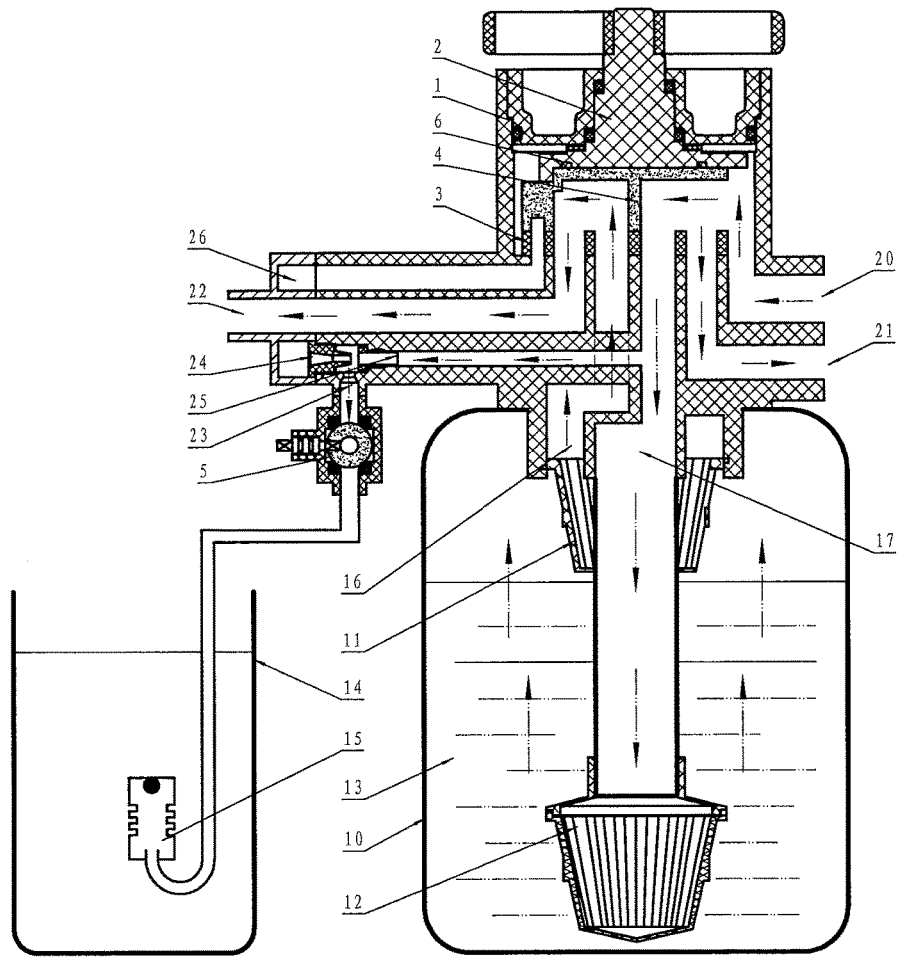
FIG. 24 is a structure schematic view of Example 3 of the invention that is in backwash status.

Example 3: Project of Six Equal Parts Up-Flow Regeneration Softener Valve, which Refills with Soft Water and Raw Water Flows Out when in Regeneration Status As shown in FIG. 22, FIG. 22 and FIG. 24, this example uses fixed disk and moving disk shown in FIG. 22 and FIG. 23. The valve body of the multi-functional softener valve in example is provided with inlet 20, outlet 21, drain 22, upper filter connector 16, lower filter connector 17 and branch of flow channel 26. On branch of flow channel, there is injector inlet 24, injector outlet 25 that connected to the lower filter connector 17, brine inlet 23 and brine control valve 5 connected to brine inlet 23. In valve body 1, there is fixed disk 3, moving disk 4, seal ring 6 and the shaft 2 that can rotate the moving disk 4. There is the sixth through-hole 36 in the center of fixed disk 3 that connected to drain 22. In the outer rotating radius, there are five through-holes. Among them, the first through-hole 31 and the second through-hole 32 are connected to upper filter connector 16, the third through-hole 33 is connected to lower filter connector 17, and the fourth through-hole 34 is connected to outlet 21. The outer diameter of the fourth through-hole 34 is bigger than other through-holes. And the fifth through-hole 35 is connected to injector inlet 24 by branch of flow channel 26. There is a through-hole 41 connected to inlet 20, a radial blind hole 42 that is from center to circumferential direction, and an arc-shaped blind hole 43 that round the central in moving disk 4. The part of outer diameter of the blind hole 43 is bigger other edges of sealing surface and as big as the through-hole 34. The through-holes of fixed disk 3 and moving disk 4 are matching in the same rotating radius. In production, fixed disk 3 and moving disk 4 adopt different materials such as ceramic. The through-hole 31 and 32 of fixed disk can be connected to be one through-hole, but it is inconvenient to process.

Such designed softener valve has the following advantages: 1, Brine draw for regeneration and brine refill can be controlled by brine control valve 5 that only require a small flow, and the disk can be divided in six equal parts, which can increase the flow rate. 2, Brine refill can be controlled by procedure or brine control valve 5 manually when it needs. For the softener valve of residential softener, it can achieve brine refill after service, in service, or any other time when it needs, which has a wider range of applications. At the same time, you can save regeneration time. 3, Controlling by brine control valve 5, the brine tank can be refilled with soft water, which will enhance a better regeneration effect of resin. 4, This example adopts up-flow regeneration, which can enhance the regeneration effect of resin and save salt and water. 5, When it in backwash, regeneration and fast rinse, part of raw water can flow out from outlet directly, which can provide the emergency water when in regeneration status.

Figure 25:
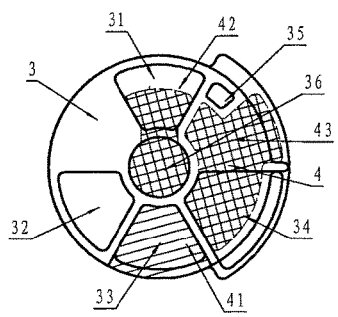
FIG. 25 is a matching schematic view of moving disk relative to fixed disk in FIG. 24 (Backwash)

The differences between Example 3 and Example 1: In Example 3, the outer diameter of the through-hole is bigger than other through-hole and the edge of sealing surface; the part of outer diameter of blind hole 43 is bigger than the edge of other sealing surface and as big as the outer diameter of through-hole 34. The following illustration is only about the backwash status, and the other four functions are no longer specified Backwash status: Referring to FIG. 24 and FIG. 25, by rotating the shaft 2, the through-hole 41 of moving disk 4 and the third through-hole 33 of fixed disk 3 overlap, the blind hole 42 is connected to the first through-hole 31 and the sixth through-hole 36, the blind hole 43 is only connected to the fourth through-hole 34, and the brine control valve 5 is closed. Because the outer diameter of the fourth through-hole 34 is bigger, the sealing surface of moving disk 4 does not cover it completely. At that time, a part of water flows from the inlet 20 into the through-hole 41 and then flows into the third through-hole 33, through valve body 1 to the lower filter connector 17, through the bottom strainer 12 to tank 10, through and rinses filter element 13, and the dirt goes through top strainer 11 to the upper filter connector 16, then goes through the first through-hole 31 and blind hole 42 to the sixth through-hole 36. Due to the connection of the sixth through-hole 36 and drain 22, the water flows from drain 22; the other part of water flows from inlet 20 into the fourth through-hole 34 and flows out from outlet 21 directly. At that time, the blind hole 43 is only connected to the fourth through-hole 34, and no water flows.

Figure 26:
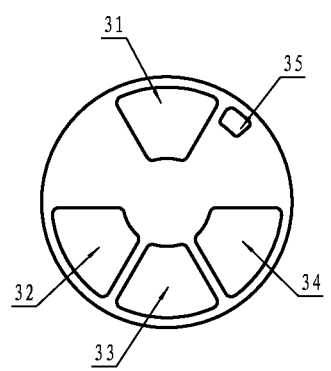
FIG. 26 is a structure schematic view of a fixed disk of Example 4 of the invention (Top view of the fixed disk)
Figure 27:
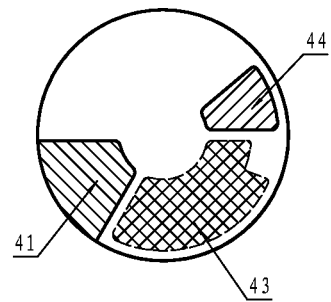
FIG. 27 is a top view of a moving disk of Example 4 of the invention (Top view of the moving disk)
Figure 28:
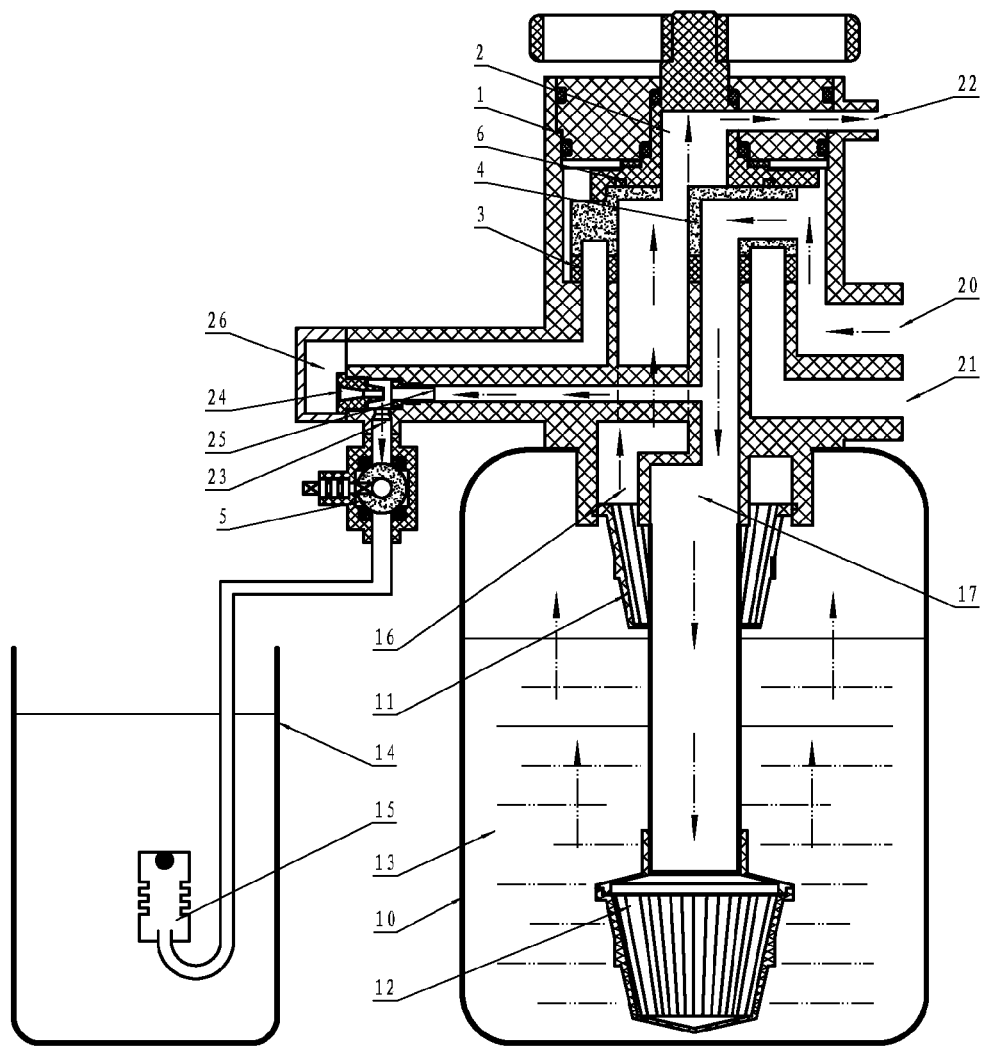
FIG. 28 is a structure schematic view of Example 4 of the invention that is in backwash status.

Example 4: Project of Six Equal Parts Up-Flow Regeneration Softener Valve, which Refills with Soft Water and Drain Out from Shaft As shown in FIG. 26, FIG. 27 and FIG. 28, this example uses fixed disk and moving disk shown in FIG. 26 and FIG. 27. The valve body of the multi-functional softener valve in example is provided with inlet 20, outlet 21, drain 22, upper filter connector 16, lower filter connector 17 and branch of flow channel 26. On branch of flow channel, there is injector inlet 24, injector outlet 25 that connected to the lower filter connector 17, brine inlet 23 and brine control valve 5 connected to brine inlet 23. In valve body 1, there is fixed disk 3, moving disk 4, seal ring 6 and the shaft 2 that can rotate the moving disk 4. There are five through-holes in the fixed disk 3. Among them, the first through-hole 31 and the second through-hole 32 are connected to upper filter connector 16, the third through-hole 33 is connected to lower filter connector 17, and the fourth through-hole 34 is connected to outlet 21. And the fifth through-hole 35 is connected to injector inlet 24 by branch of flow channel 26. There is a through-hole 41 connected to inlet 20, a through-hole 44 connected to drain 22 of shaft, and an arc-shaped blind hole 43 that round the central in the sealing surface of moving disk 4. The through-holes of fixed disk 3 and moving disk 4 are matching in the same rotating radius.

The differences between Example 4 and Example 1: In Example 4, there is no sixth through-hole 36 in the center of fixed disk 3, and the radial blind hole 42 of moving disk is changed to through-hole 44. The following illustration is only about the backwash status, and the other four functions are no longer specified.

Figure 29:
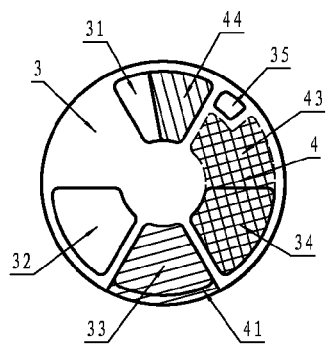
FIG. 29 is a matching schematic view of moving disk relative to fixed disk in FIG. 28 (Backwash)

Backwash status: Referring to FIG. 28 and FIG. 29, by rotating the shaft 2, the through-hole 41 of moving disk 4 and the third through-hole 33 of fixed disk 3 overlap, the through-hole 44 is connected to the first through-hole 31, the blind hole 43 is only connected to the fourth through-hole 34, and the brine control valve 5 is closed. At that time, the water flows from the inlet 20 into the through-hole 41 and then flows into the third through-hole 33, through valve body 1 to the lower filter connector 17, through the bottom strainer 12 to tank 10, through and rinses filter element 13, and the dirt goes through top strainer 11 to the upper filter connector 16, then goes through the first through-hole 31 and through-hole 44 to the outlet 22 through shaft. At that time, the blind hole 43 is only connected to the fourth through-hole 34, and no water flows.

Example 5: Project of Softener Valve of Six Equal Parts for Floating Bed, which Refills with Soft Water Floating bed adopts up-flow service. The resin is high in the tank of floating bed, which can treat the water with high hardness. Because of the mass of resin, floating bed is without backwash status, and the mixed water flows from top to bottom when in regeneration status.

Figure 30:
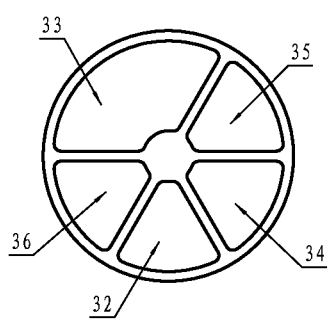
FIG. 30 is a structure schematic view of a fixed disk of Example 5 of the invention (Top view of the fixed disk)
Figure 31:
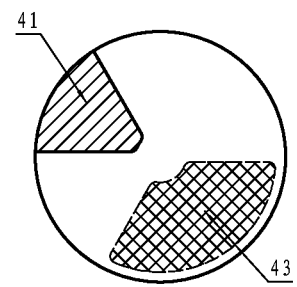
FIG. 31 is a top view of a moving disk of Example 5 of the invention (Top view of the moving disk)
Figure 32:
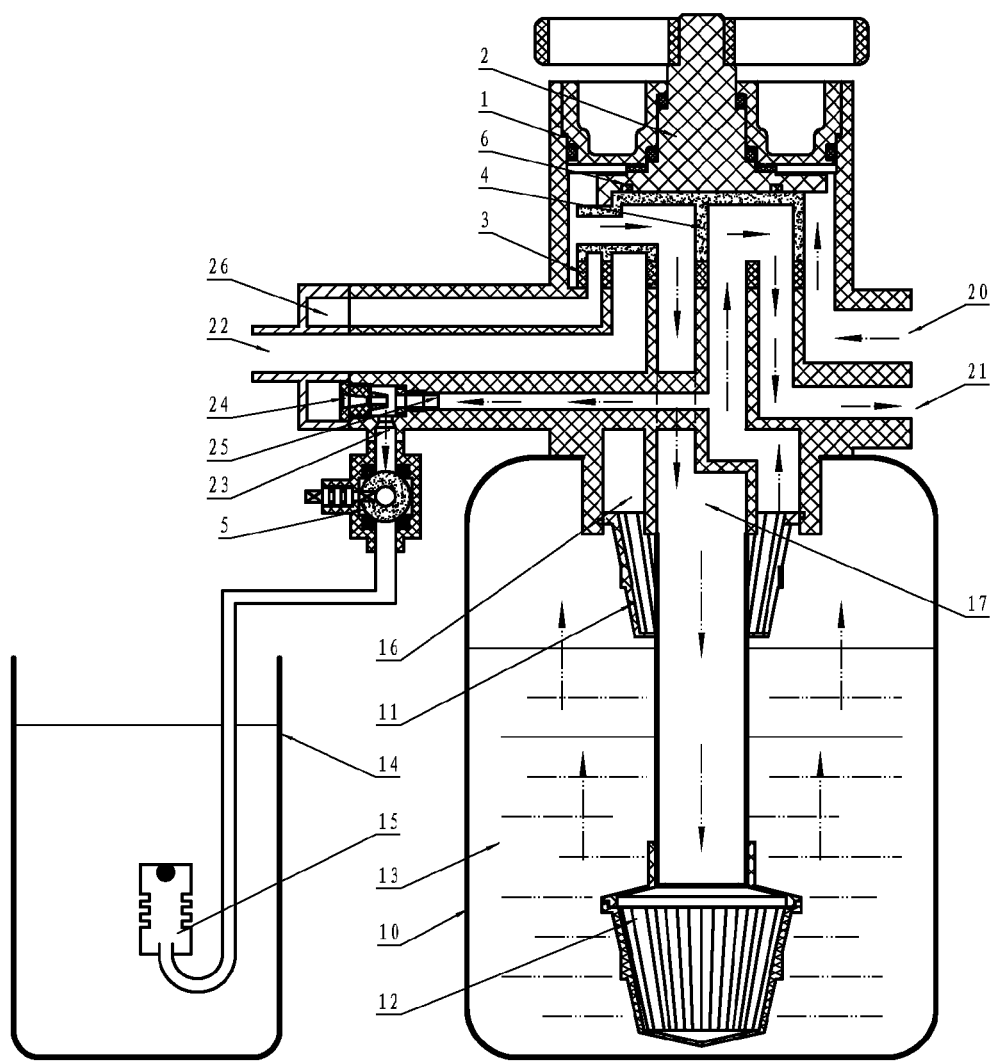
FIG. 32 is a structure schematic view of Example 5 of the invention that is in softening water status.

As shown in FIG. 30, FIG. 31 and FIG. 32, this example uses fixed disk and moving disk shown in FIG. 30 and FIG. 31. The valve body of the multi-functional softener valve in this example is provided with inlet 20, outlet 21, drain 22, upper filter connector 16, lower filter connector 17 and branch of flow channel 26. On branch of flow channel, there is the injector inlet 24, injector outlet 25 that connected to the upper filter connector 16, brine inlet 23 and brine control valve 5 connected to brine inlet 23. In valve body 1, there is fixed disk 3, moving disk 4, seal ring 6 and the shaft 2 that can rotate the moving disk 4. In the fixed disk 3, there are five through-holes. Among them, the first through-hole 33 is connected to lower filter connector 17, the second through-hole 36 is connected to the drain pipe, the third through-hole 32 is connected to the upper filter connector 16, the fourth through-hole 34 is connected to outlet 21, and the fifth through-hole 35 is connected to injector inlet 24 by branch of flow channel 26. The first through-hole 33 is next to the second through-hole 36, the second through-hole 36 is next to the third through-hole 32, the third through-hole 32 is next to fourth through-hole 34, the fourth through-hole 34 is next to the fifth through-hole 35, and the fifth through-hole 35 is next the first through-hole 33. There is a through-hole 41 connected to inlet 20 and an arc-shaped blind hole 43 that round the central in the sealing surface of moving disk 4. The through-holes of fixed disk 3 and moving disk 4 are matching in the same rotating radius. In production, fixed disk 3 and moving disk 4 adopt different materials such as ceramic.

Such designed softener valve has the following advantages: 1, Adopting up-flow service to soften water can treat the water with high hardness. 2, Brine draw for regeneration and brine refill can be controlled by brine control valve 5 that only require a small flow, and the disk can be divided in six equal parts, which can increase the flow rate. 3, Brine refill can be controlled by procedure or brine control valve 5 manually when it needs. For the softener valve of residential softener, it can achieve brine refill after service, in service, or any other time when it needs, which has a wider range of applications. At the same time, it can save regeneration time. 4, Controlling by brine control valve 5, the brine tank can be refilled with soft water, which will enhance a better regeneration effect of resin.

The following illustration is about the details of different functions of the fixed disk and moving disk in the different matching states.

Figure 33:
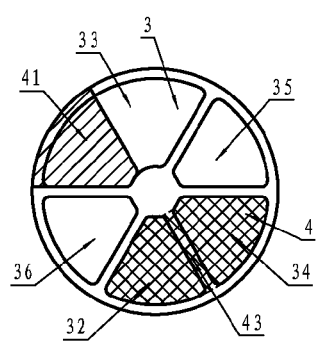
FIG. 33 is a matching schematic view of moving disk relative to fixed disk in FIG. 32 (Service)

Softening water status: Referring to FIG. 32 and FIG. 33, by rotating the shaft 2, the through-hole 41 of moving disk 4 and the first through-hole 33 of fixed disk 3 overlap, the blind hole 43 is connected to the third through-hole 32 and the fourth through-hole 34, and the brine control valve 5 is closed. At that time, water flows from the inlet 20 into the through-hole 41 and then flows into the first through-hole 33, through valve body 1 to the lower filter connector 17, through the bottom strainer 12 to tank 10, flows up through filter element 13 and treated by filter element 13, then goes through top strainer 11 to upper filter connector 16, then flows through the third through-hole 32, through blind hole 43 to the fourth through-hole 34. Because the fourth through-hole 34 is connected to outlet 21, the water flows out from outlet 21.

Figure 34:
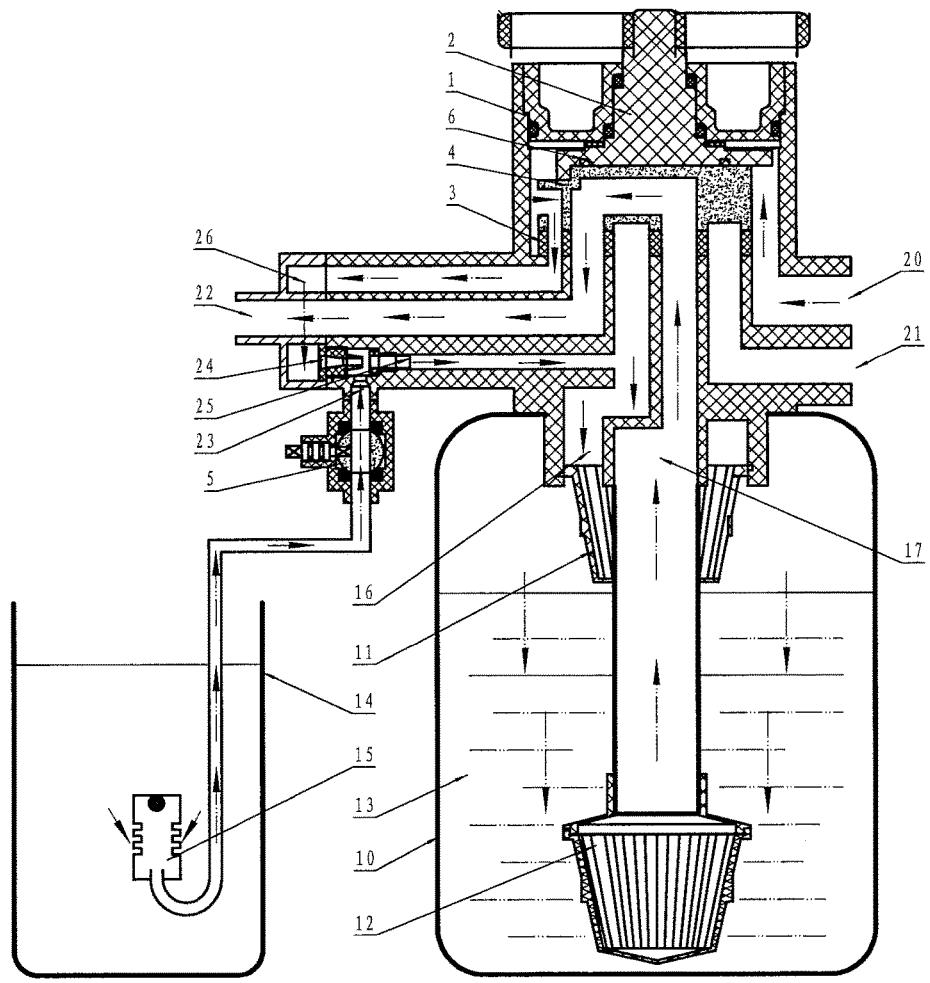
FIG. 34 is a structure schematic view of Example 5 of the invention that is in brine draw status.
Figure 35:
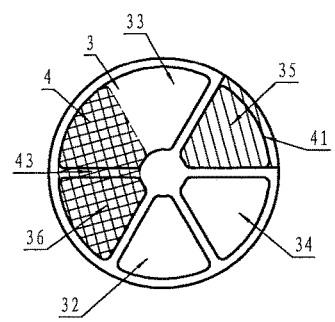
FIG. 35 is a matching schematic view of moving disk relative to fixed disk in FIG. 34 (Brine draw)

Brine draw for regeneration status: Referring to FIG. 34 and FIG. 35, by rotating the shaft 2, the through-hole 41 of moving disk 4 and the fifth through-hole 35 of fixed disk 3 overlap, the blind hole 43 is connected to the first through-hole 33 and the second through-hole 36. At that time, water flows through inlet 20 into the through-hole 41 and then flows into the fifth through-hole 35, through branch of flow channel 26 into the injector inlet 24. After ejection, there is negative pressure in brine inlet 23, and opens the brine control valve 5. At that time, the regenerate in brine tank 14 goes to brine control valve 5 and brine inlet 23 through pipeline. It is mixed with the water flowing from injector inlet 24, and then goes to injector outlet 25. Because injector outlet 25 is connected to upper filter connector 16, the mixed water flows through upper filter connector 16, top strainer 11 and then into the tank 10. It goes down through filter element 13 and regenerates the filter element, then goes through bottom strainer 12 to lower filter connector 17. Then water flows to the first through-hole 33, through blind hole 43 to the second through-hole 36. Because the second through-hole 36 is connected to drain 22, water flows out from drain 22.

Figure 36:
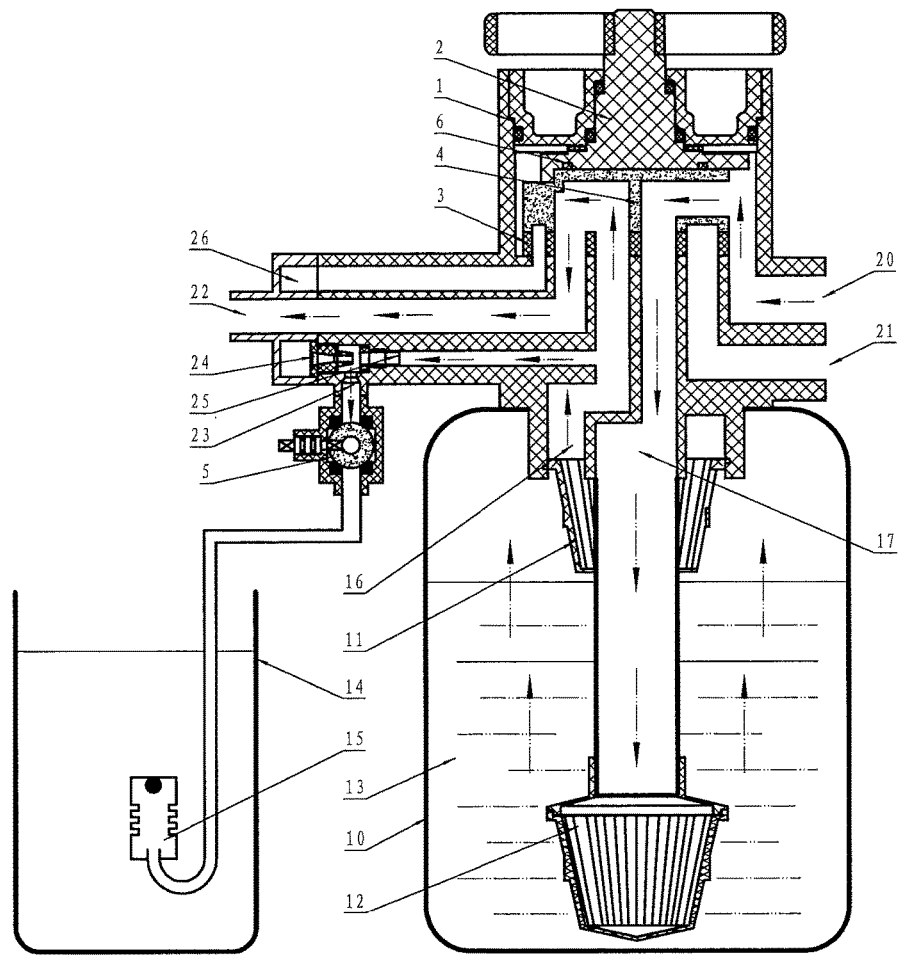
FIG. 36 is a structure schematic view of Example 5 of the invention that is in fast rinse status.
Figure 37:
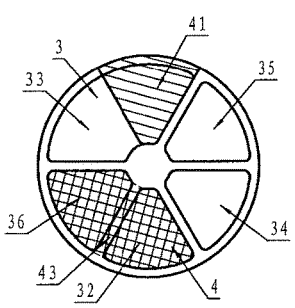
FIG. 37 is a matching schematic view of moving disk relative to fixed disk in FIG. 36 (Fast rinse)
Figure 38:
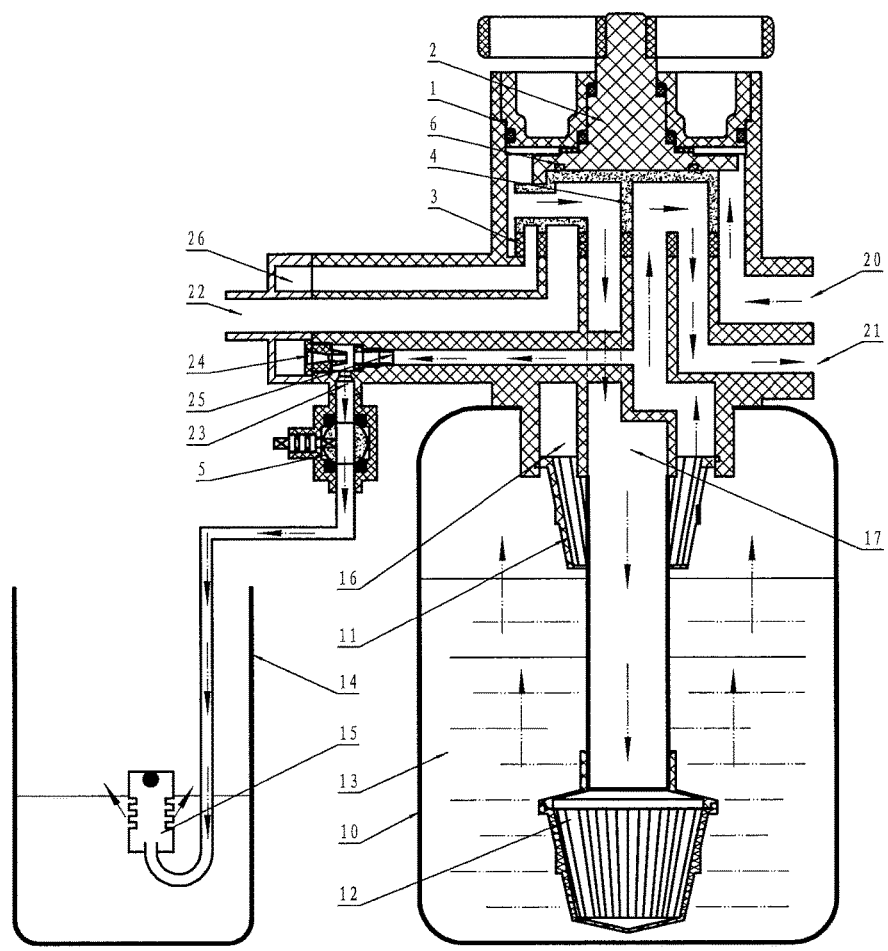
FIG. 38 is a structure schematic view of Example 5 of the invention that is in softening water and brine refill status.
Figure 39:
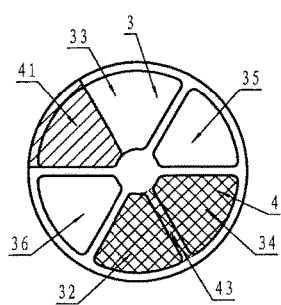
FIG. 39 is a matching schematic view of moving disk relative to fixed disk in FIG. 38, same as FIG. 33 (Brine refill).

Fast rinse status: Referring to FIG. 36 and FIG. 37, by rotating the shaft 2, the through-hole 41 of moving disk 4 and the first through-hole 33 of fixed disk 3 overlap, the blind hole 43 is connected to the third through-hole 32 and the second through-hole 36, and the brine control valve 5 is closed. At that time, water flows through the inlet 20 into the through-hole 41 and then flows into the first through-hole 33, through valve body 1 to the lower filter connector 17, through the bottom strainer 12 to tank 10, goes up through filter element 13 and rinses the residual regenerate, and the residue goes through top strainer 11 to the upper filter connector 16, then goes through the third through-hole 32 and blind hole 43 to the second through-hole 36. Because the second through-hole 36 is connected to drain 22, water flows out from drain 22.

Brine refill status: When brine refill, it only needs to open brine control valve 5, because brine control valve 5 is connected to brine tank 14, and brine control valve 5 is connected to upper filter connector 16 through brine inlet 23 and injector outlet 25. Thus, in the status of softening and fast rinse, open the brine control valve 5 to refill the brine tank. The following illustration is about the brine refill when in softening status. Referring to FIG. 36 and FIG. 37, by rotating the shaft 2, the through-hole 41 of moving disk 4 and the first through-hole 33 of fixed disk 3 overlap, the blind hole 43 is connected to the third through-hole 32 and the fourth through-hole 34, and open the brine control valve 5. At that time, water flows through the inlet 20 into the through-hole 41 and then flows into the first through-hole 33, through valve body 1 to the lower filter connector 17, through the bottom strainer 12 to tank 10, after treated by filter element 13, goes through top strainer 11 to the upper filter connector 16, then goes through the third through-hole 32 and blind hole 43 to the fourth through-hole 34. Because the fourth through-hole 34 is connected to outlet 21, water flows out from outlet 21. Because upper filter connector 16 is connected to injector outlet 25, a part of water flows through upper filter connector 16 into injector outlet 25, then through brine inlet 23, brine control valve 5 and into brine tank 14. The water flows from injector outlet 25 to the fifth through-hole 35 of fixed disk 3 through injector inlet 24 and branch of flow channel 26. Because the fifth through-hole 35 does not pass, so no water flows.

The above are only preferred modes of execution of this invention. It should be noted that it can be improved or modified on the basis of technical principles of this invention for the ordinary technical personnel in this technology field. These improvements and modifications are considered as the scope of this invention. Such as changing the shape of the holes in the moving or fixed discs, adjusting the inlet through-hole in the moving disk and the location of blind through-hole, changing the shape of through-hole of fixed disk, changing the brine control valve, etc. which are all considered as the scope of this invention.

What is claimed is:

1. A multi-functional softener valve comprising: a valve body, an injector, a moving disk, a fixed disk and a brine control valve, wherein: the valve body is provided with an inlet, an outlet, a drain and a brine absorption branch of a flow channel, and is also provided with through-holes connected to an upper filter, a lower filter, an injector inlet, and an injector outlet; wherein the injector outlet is connected to the lower filter such that water can pass from the injector outlet to the lower filter without contacting the fixed disk or moving disk; a brine inlet is located in the brine absorption branch of the flow channel; the brine control valve is located on the brine inlet; a plurality of the through-holes are located in the fixed disk, and the through-holes are distributed in six equal sectors of a circular face of the fixed disk, wherein, on the circular face of the fixed disk, in a counterclockwise direction, a first through-hole and a second through-hole are connected to the upper filter with the upper filter being connected to the valve body, a third through-hole is connected to the lower filter, a fourth through-hole is connected to the outlet, and a fifth through-hole is connected to the injector inlet, a sixth through-hole is set in a center of the circular face of the fixed disk that is connected to a drain of the valve body; the circular face of the fixed disk matches with a circular face of the moving disk; and on the circular face of the moving disk, an inlet through-hole connected to the inlet of the valve body, a radial blind hole that is from a center to circumferential direction, and an arc-shaped blind hole are set.

2. The multi-functional softener valve of claim 1, wherein the matching relationship of the moving disk, the fixed disk and the brine control valve is as follows: when the inlet through-hole of the moving disk is connected to the second through-hole of the fixed disk, the arc-shaped blind hole on the moving disk is connected to the third through-hole and the fourth through-hole of the fixed disk, the radial blind hole of the moving disk is only connected to the sixth through-hole of the fixed disk, and the brine control valve can be opened or closed; when the inlet through-hole of the moving disk is connected to the third through-hole of the fixed disk, the arc-shaped blind hole of the moving disk is only connected to the fourth through-hole of the fixed disk, the radial blind hole of the moving disk is connected to the first through-hole and the sixth through-hole of the fixed disk, and the brine control valve is closed; when the inlet through-hole of the moving disk is connected to the fifth through-hole of the fixed disk, the arc-shaped blind hole of the moving disk is only connected to the first through-hole of the fixed disk, the radial blind hole of the moving disk is connected to the second through-hole and the sixth through-hole of the fixed disk, and the brine control valve is opened; when the inlet through-hole of the moving disk is connected to the first through-hole of the fixed disk, the arc-shaped blind hole of the moving disk is only connected to the second through-hole of the fixed disk, the radial blind hole of the moving disk is connected to the third through-hole and the sixth through-hole of the fixed disk, and the brine control valve is closed.

3. The multi-functional softener valve of claim 2, wherein the brine control valve comprises a ball valve, a solenoid valve, a check valve, a diaphragm valve or a gate valve.

4. The multi-functional softener valve of claim 1, wherein the injector inlet and the injector outlet are located in the brine absorption branch of the flow channel.

5. The multi-functional softener valve of claim 1, wherein the brine control valve comprises a ball valve, a solenoid valve, a check valve, a diaphragm valve or a gate valve.

6. A water treatment device comprising the multi-functional softener valve of claim 1, wherein the multi-functional softener valve is connected to a tank containing an cation exchange resin.

* * * * *